US011960134B2

(12) United States Patent
Valek et al.

(10) Patent No.: US 11,960,134 B2
(45) Date of Patent: Apr. 16, 2024

(54) POWERED FIBER DISTRIBUTION HUB

(71) Applicant: COMMSCOPE TECHNOLOGIES LLC, Hickory, NC (US)

(72) Inventors: Gregory G. Valek, Prior Lake, MN (US); Arturo Maya Pereyra, Chihuahua (MX); Jesus Gustavo Pureco Chico, Chihuahua (MX); Porfirio Salazar Castrejón, Chihuahua (MX); Carlos Arroyo, Chihuahua (MX)

(73) Assignee: CommScope Technologies, LLC, Hickory, NC (US)

( * ) Notice: Subject to any disclaimer, the term of this patent is extended or adjusted under 35 U.S.C. 154(b) by 113 days.

(21) Appl. No.: 17/761,873

(22) PCT Filed: Sep. 18, 2020

(86) PCT No.: PCT/US2020/051533
§ 371 (c)(1),
(2) Date: Mar. 18, 2022

(87) PCT Pub. No.: WO2021/055779
PCT Pub. Date: Mar. 25, 2021

(65) Prior Publication Data
US 2022/0365303 A1    Nov. 17, 2022

Related U.S. Application Data

(60) Provisional application No. 62/903,222, filed on Sep. 20, 2019.

(51) Int. Cl.
*G02B 6/00* (2006.01)
*G02B 6/44* (2006.01)

(52) U.S. Cl.
CPC .................. *G02B 6/4452* (2013.01)

(58) Field of Classification Search
CPC .............. G02B 6/4452; G02B 6/44526; G02B 6/44528; G02B 6/00; H04Q 1/026
See application file for complete search history.

(56) References Cited

U.S. PATENT DOCUMENTS

| 6,788,535 | B2 | 9/2004 | Dodgen et al. |
| 7,088,899 | B2 | 8/2006 | Reagan et al. |
| 7,245,809 | B1 | 7/2007 | Gniadek et al. |

(Continued)

OTHER PUBLICATIONS

International Search Report and Written Opinion of the International Searching Authority for International Patent Application No. PCT/US2020/051533 dated Jan. 4, 2021, 13 pages.

(Continued)

*Primary Examiner* — Jennifer Doan
(74) *Attorney, Agent, or Firm* — Merchant & Gould P.C.

(57) ABSTRACT

A fiber distribution hub includes a power supply and active equipment mounted to a movable frame within a cabinet. The active equipment draws power from the power supply. The movable frame blocks access to the power connections when in a closed position within the cabinet. The movable frame provides access to the power connections when in an open position. Optical connections between feeder and distribution fibers are made at active and/or passive equipment mounted to the movable frame.

20 Claims, 17 Drawing Sheets

(56) References Cited

U.S. PATENT DOCUMENTS

| | | | |
|---|---|---|---|
| 7,873,255 B2 | 1/2011 | Reagan et al. | |
| 8,121,458 B2 | 2/2012 | Barth et al. | |
| 8,569,618 B2 * | 10/2013 | Landry | G02B 6/4446 248/57 |
| 8,867,234 B2 * | 10/2014 | Heimann | H04Q 1/025 370/352 |
| 9,095,045 B2 * | 7/2015 | Rojo | H04Q 1/03 |
| 2005/0002633 A1 | 1/2005 | Solheid et al. | |
| 2007/0189691 A1 | 8/2007 | Barth et al. | |
| 2011/0262100 A1 | 10/2011 | Reagan et al. | |
| 2019/0079256 A1 | 3/2019 | Landry et al. | |

OTHER PUBLICATIONS

AgileMax® 1RU AM3200A, AM3217A, Complete OBI Elimination HPON(TM) Distribution Solution, Arris, 1-4 (Jun. 2018).
AgileMax® 1RU AM3200D CWDM, Complete OBI Elimination HPON(TM) Distribution Solution, Arris, 1-3 (Nov. 2017).

* cited by examiner

POWERED FIBER DISTRIBUTION HUB

CROSS-REFERENCE TO RELATED APPLICATION

This application is a National Stage Application of PCT/US2020/051533, filed on Sep. 18, 2020, which claims the benefit of U.S. Patent Application Ser. No. 62/903,222, filed on Sep. 20, 2019, the disclosures of which are incorporated herein by reference in their entireties. To the extent appropriate, a claim of priority is made to each of the above disclosed applications.

BACKGROUND

Optical networks enable service providers to deliver high bandwidth communication capabilities to customers. FIG. 1 illustrates an example network 100 deploying passive fiber optic lines. As shown, the network 100 can include a central office 101 that connects a number of end subscribers 105 (also called end users 105 herein) in a network. The central office 101 can additionally connect to a larger network such as the Internet (not shown) and a public switched telephone network (PSTN). The network 100 can also include fiber distribution hubs (FDHs) 103 having one or more optical splitters (e.g., 1-to-8 splitters, 1-to-16 splitters, or 1-to-32 splitters) that generate a number of individual fibers that may lead to the premises of an end user 105. The various lines of the network 100 can be aerial or housed within underground conduits.

The portion of the network 100 that is closest to central office 101 is generally referred to as the F1 region, where F1 is the "feeder fiber" from the central office 101. The portion of the network 100 closest to the end users 105 can be referred to as an F2 portion of network 100. The network 100 includes a plurality of break-out locations 102 at which branch cables are separated out from the main cable lines. Branch cables are often connected to drop terminals 104 that include connector interfaces for facilitating coupling of the fibers of the branch cables to a plurality of different subscriber locations 105.

Splitters used in an FDH 103 can accept a feeder cable F1 having a number of fibers and may split those incoming fibers into, for example, 216 to 432 individual distribution fibers that may be associated with a like number of end user locations. In typical applications, an optical splitter is provided prepackaged in an optical splitter module housing and provided with a splitter output in pigtails that extend from the module. The splitter output pigtails are typically connectorized with, for example, SC, LC, or LX.5 connectors. The optical splitter module provides protective packaging for the optical splitter components in the housing and thus provides for easy handling for otherwise fragile splitter components. This modular approach allows optical splitter modules to be added incrementally to FDHs 103 as required.

Passive optical networks have been considered a desirable choice for delivering high-speed communication data because the absence of active electronic devices may decrease network complexity and/or cost and may increase network reliability.

SUMMARY

Some aspects of the disclosure are directed to an optical network including one or more active components.

In certain implementations, a fiber distribution hub includes a power supply and active equipment mounted to a movable frame within a cabinet. The active equipment draws power from the power supply.

In certain examples, the movable frame blocks access to the power connections when in a closed position within the cabinet. In certain examples, the movable frame provides access to the power connections when in an open position. In certain examples, optical connections between feeder and distribution fibers are made at active and/or passive equipment mounted to the movable frame.

In certain implementations, a fiber distribution hub includes a cabinet; a frame pivotally mounted to the cabinet between open and closed positions; a power supply mounted to the frame to be carried with the frame between the open and closed positions; and an active splitting module mounted to the frame to be carried with the frame as the frame moves between the open and closed positions.

In certain examples, the active splitting module includes a housing having a front face accessible from the front side of the frame. In certain examples, the active splitting module includes a first de-mateable connection interface location and a plurality of second de-mateable connection interface locations disposed at the front face. The active splitting module is configured to split an optical signal received at the first de-mateable connection interface location and to provide the split optical signal at the second de-mateable connection interface locations. In certain examples, the active splitting module is coupled to the power supply.

In certain implementations, a cross-connect region is carried by the frame. The cross-connect region includes fiber optic adapters, each having a front port accessible from the front side of the frame and a rear port accessible from the rear side of the frame. In an example, the cross-connect region is disposed above the active splitting module on the frame.

In certain implementations, wherein the active splitting module splits the optical signals by wavelength.

In certain implementations, the active splitting module includes an amplifier to boost a strength of at least some of the optical signals passing through the active splitting module.

In certain implementations, the active splitting module is one of a plurality of active splitting modules mounted to the frame. In certain examples, the active splitting modules are daisy-chained to the power supply.

In certain implementations, a fan out region is disposed at a top of the frame, wherein the fan out region includes at least a first fan out for separating fibers of a feeder cable and at least a second fan out for separating fibers of a distribution cable.

In certain implementations, the frame includes a first routing path and a second routing path. The first routing path extends from a first fan out to a rear side of the frame. The second routing path extends from a second fan out to a front side of the frame. In certain examples, the frame also includes a vertical routing channel disposed at the front side of the frame along the first routing path. The vertical routing channel extends past the active splitting module.

In certain implementations, one or more passive optical splitters are mounted to the frame to be carried with the frame when the frame moves relative to the cabinet.

In certain implementations, a pass-through termination field is mounted to the frame to be carried with the frame when the frame moves relative to the cabinet.

In certain implementations, a shroud arrangement is mounted to an exterior surface of the cabinet. The shroud arrangement includes a mounting station spaced from the exterior surface of the cabinet. In certain examples, a virtual hub can be mounted to the shroud at the mounting station.

In certain examples, the shroud arrangement includes a bracket that attaches to the virtual hub and attaches to the shroud body at the mounting station. In certain examples, the shroud arrangement includes a shroud body defining an interior accessible through a door. The shroud body defines the mounting station. The door covers the mounting station when closed and allows access to the mounting station when open. In certain implementations, the shroud arrangement also includes a shroud adapter that encloses cables routed between a plinth and the shroud body.

In accordance with other aspects of the disclosure a fiber distribution hub includes a plinth defining first and second cable access openings; a cabinet seated on the plinth in alignment with the first cable access opening; a shroud body mounted to an exterior surface of the cabinet. The shroud body defines a mounting station for a virtual hub. In certain examples, the mounting station is outwardly spaced from the cabinet.

In certain implementations, the shroud body carries at least one door to selectively close the interior of the shroud body. In certain examples, the shroud body carries at least two doors. In certain examples, the door is a wrap-around door.

In certain implementations, a shroud adapter extends between the second cable access opening of the plinth and a cable opening of the shroud body to define a cable routing passage between the plinth and the shroud body.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows.

DETAILED DESCRIPTION

Reference will now be made in detail to exemplary aspects of the present disclosure that are illustrated in the accompanying drawings. Wherever possible, the same reference numbers will be used throughout the drawings to refer to the same or like parts.

Figure 1:
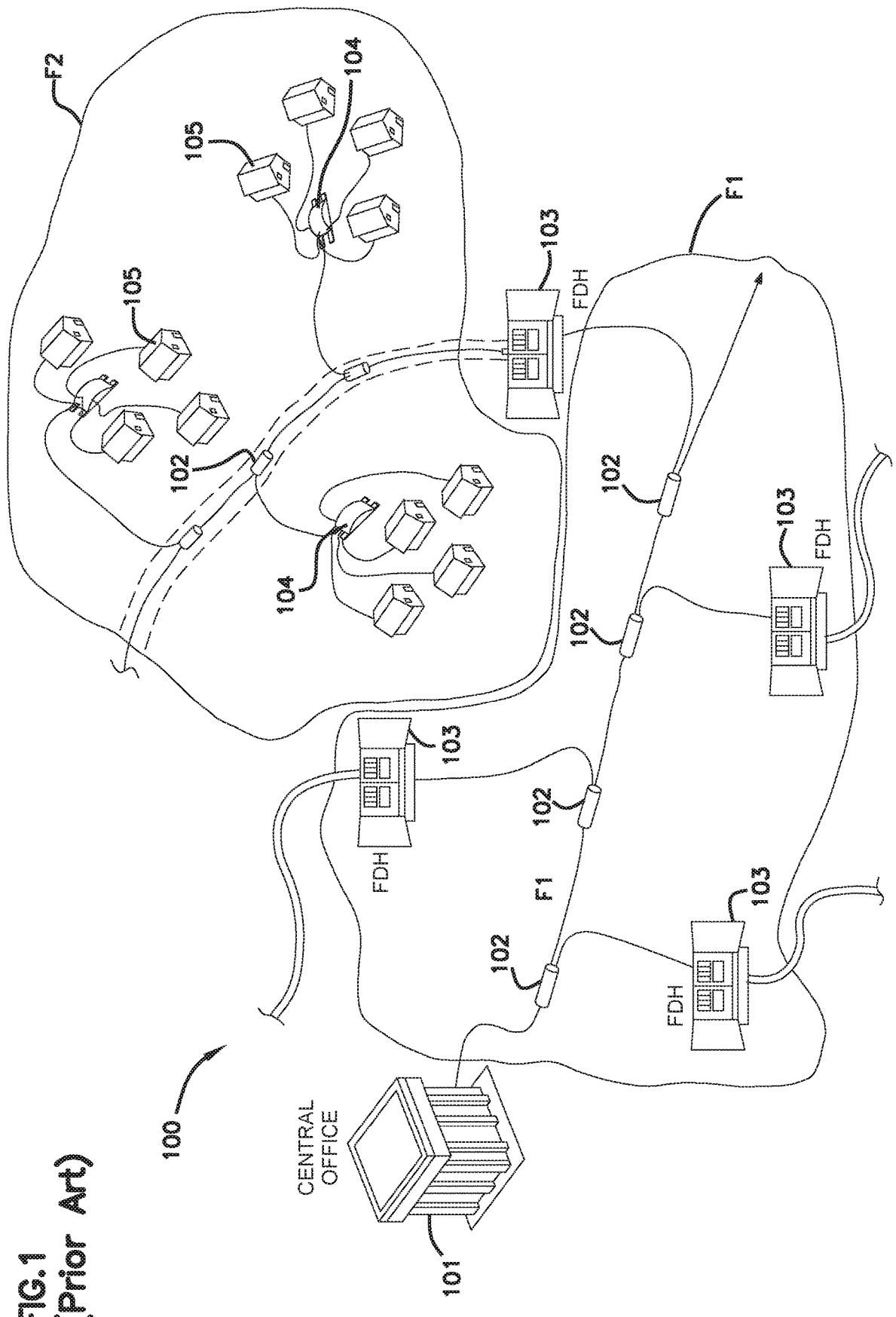
FIG. 1 shows an example fiber optic network including only passive components including one or more passive fiber distribution hubs.
Figure 2:
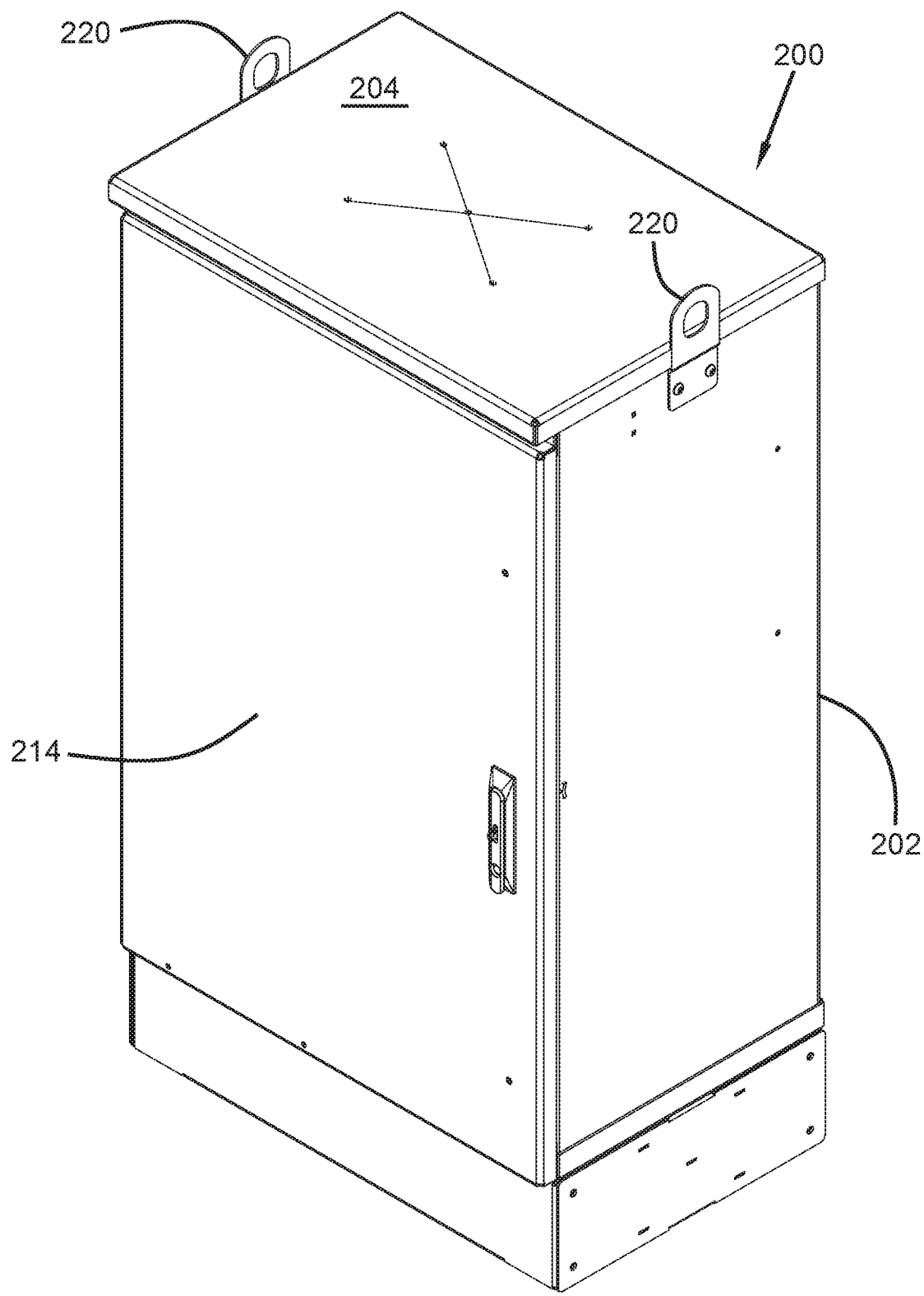
FIG. 2 is a perspective view of an example active fiber distribution hub including a cabinet having a door shown in a closed position.

The present disclosure is directed to a fiber distribution hub (FDH) having some active components. Referring now to FIG. 2, an example fiber distribution hub (FDH) 200 in accordance with the principles of the present disclosure is shown. The FDH 200 provides an interconnect interface for optical transmission signals at a location in the network where operational access and reconfiguration are desired. For example, in accordance with some aspects, the FDH 200 can be used to split optical signals carried over one or more feeder cables 180 and to connect the split signals to subscriber distribution cables 190 routed to subscriber locations 105. In accordance with other aspects, the FDH 200 also can provide signals directly from the feeder cables 180 to the subscriber cables 190 without splitting the signals.

The FDH 200 includes a cabinet 202 that houses internal components. The cabinet 202 is designed to accommodate a range of alternative sizes and fiber counts and support factory installation of pigtails, fanouts and splitters. In general, the cabinet 202 of the FDH 200 is configured to protect the internal components against rain, wind, dust, rodents and other contaminants. However, the cabinet 202 remains relatively lightweight for easy installation, and breathable to prevent accumulation of moisture in the unit. In some embodiments, an aluminum construction with a heavy powder coat finish also provides for corrosion resistance. In one example embodiment, the cabinet 202 is manufactured from heavy gauge aluminum and is NEMA-4X rated. In other embodiments, however, other materials can also be used.

Figure 3:
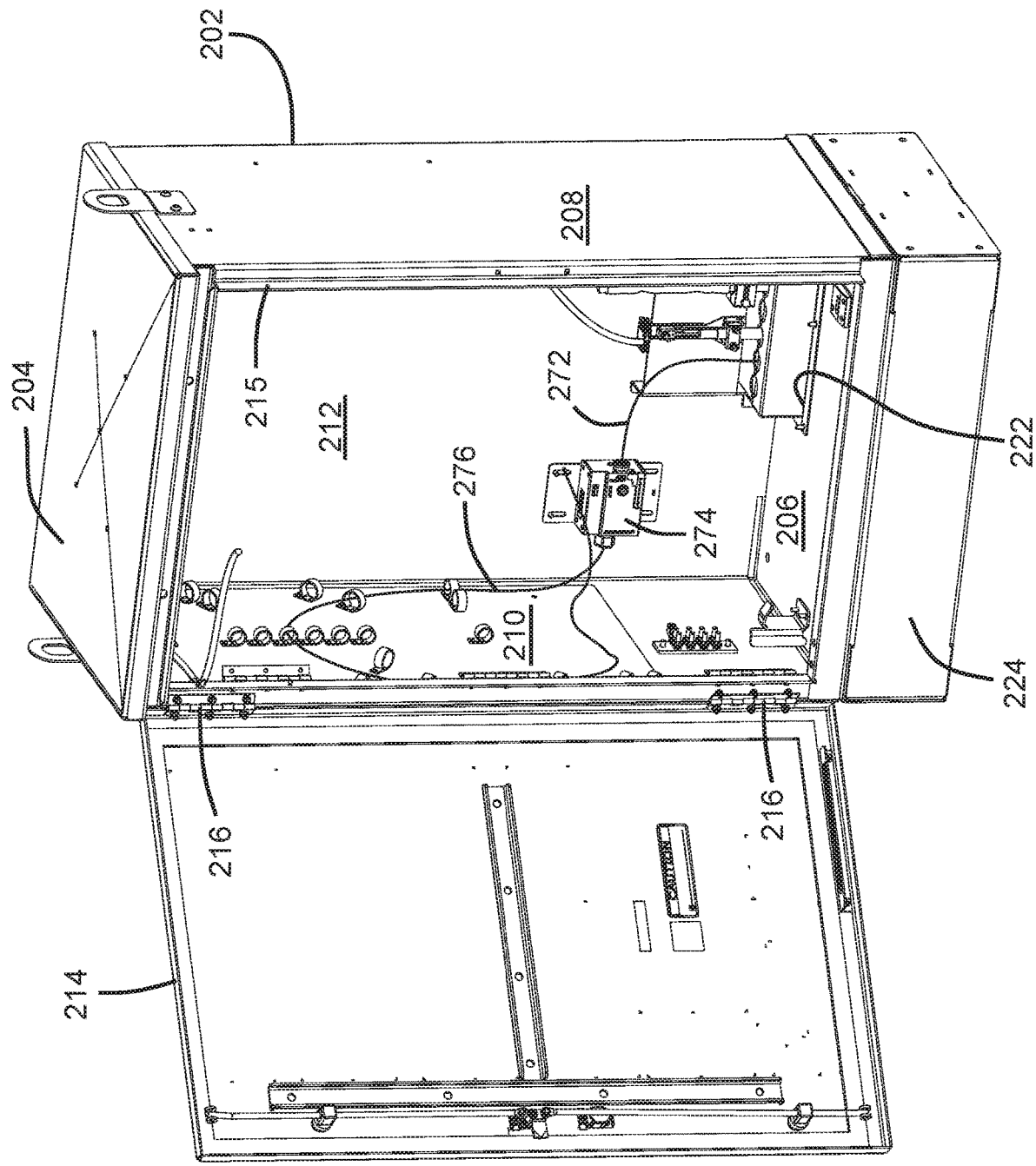
FIG. 3 is a perspective view of the cabinet of FIG. 2 with the door shown in an open position and a frame removed so that the cable port into the cabinet is visible.

In accordance with some aspects, the cabinet 202 includes a top panel 204, a bottom panel 206, a right side panel 208, a left side panel 210, a back panel 212, and at least one front door 214 that covers an access opening 215 (see FIG. 3). The at least one front door 214 is pivotally mounted to the cabinet 202 using hinges 216 to facilitate access to the components mounted within the cabinet 202. In certain implementations, the front door 214 include a lock.

In accordance with example embodiments, the FDH 200 is provided in pole mount or pedestal mount configurations. For example, as shown in FIG. 2, loops 220 can be provided on the cabinet 202 for facilitating deployment of the cabinet 202 at a desired location. The loops 220 can be used to position the cabinet using a crane. In particular, the crane can lower the cabinet 202 into an underground region. In some embodiments, the loops 220 are removable or can be adjusted to not protrude from the top cabinet panel 204.

The cabinet 202 includes a cable port 222 through which one or more feeder cables (e.g., or F1 cables) 180 and one or more distribution cables (e.g., or F2 cables) 190 enter and exit the cabinet 202. Fibers of the feeder cable 180 are optically coupled to fibers of the distribution cable 190 at one or more connection areas within the cabinet 202. Optionally, the cabinet 202 also can house a fan out region 240 at which the feeder and distribution cables 180, 190 can be separated into individual fibers or groups of fibers. Each of the fibers or groups can then be routed to an intended equipment component or temporary storage.

In some implementations, the feeder cable(s) 180 and/or the distribution cable(s) 190 are routed into the cabinet 202 during or subsequent to installation of the cabinet 202 in the field. In other implementations, the feeder cable(s) 180 and/o the distribution cable(s) 190 are stub cables having first ends 184, 194 disposed within the cabinet 202 prior to installation of the cabinet 202. Send ends of the stub cables 180, 190 are routed external of the cabinet 202 to be optically coupled to network cables during or subsequent to installation of the cabinet 202.

As shown at FIG. 3, at least one feeder cable 180 and at least one distribution cable 190 are routed into the FDH 200 through a cable port 222 defined in the cabinet 202 (e.g., typically through the back or bottom of the cabinet 202). In accordance with certain aspects, the fibers of the feeder cables 180 (i.e., the incoming fibers) and/or distribution cables 190 (i.e., the outgoing fibers) can include ribbon fibers. Some example feeder cables 180 may include 12, 24, 48, 96, 144, or greater or lesser number of individual fibers. Some example distribution cables 190 may include 144, 288, 576, 864, 1152, 1728, or a greater or lesser number of individual fibers. The incoming and outgoing fibers are routed around an interior of the cabinet 202 from the cable port 222 towards the top of the cabinet 202.

In accordance with certain aspects of the disclosure, the FDH 200 includes one or more active components. Accordingly, at least one power cable 272 also is routed into the cabinet 202 (e.g., through the cable port 222). Power carried over the power cable 272 is provided to a power supply 270, which supplies power to the one or more active components within the cabinet 202. For example, power conductors 278 may extend from the power supply 270 to the one or more active components. In certain examples, the power supply 270 works in conjunction with a power entry module 274. The power entry module 274 accepts an AC power input (e.g., hard line 40 to 90 VAC coax input power) via the power cable 272. A wire pigtail 276 extends from the power entry module 274 to the power supply 270. The power supply 270 converts the AC input to DC power. Other types of power supplies are possible.

Figure 4:
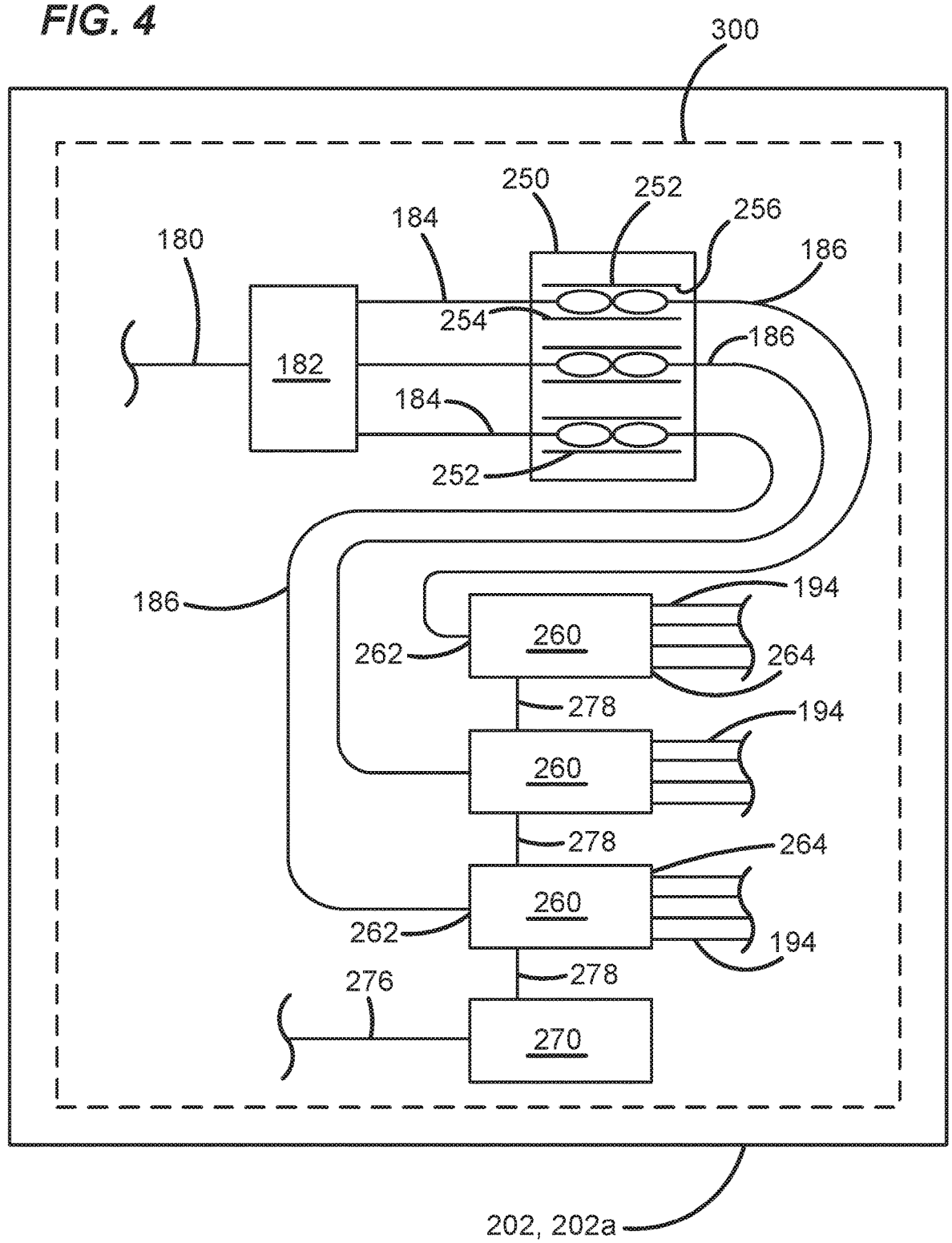
FIG. 4 is a schematic diagram showing an example cable routing scheme suitable for the active fiber distribution hub of FIG. 2.
Figure 5:
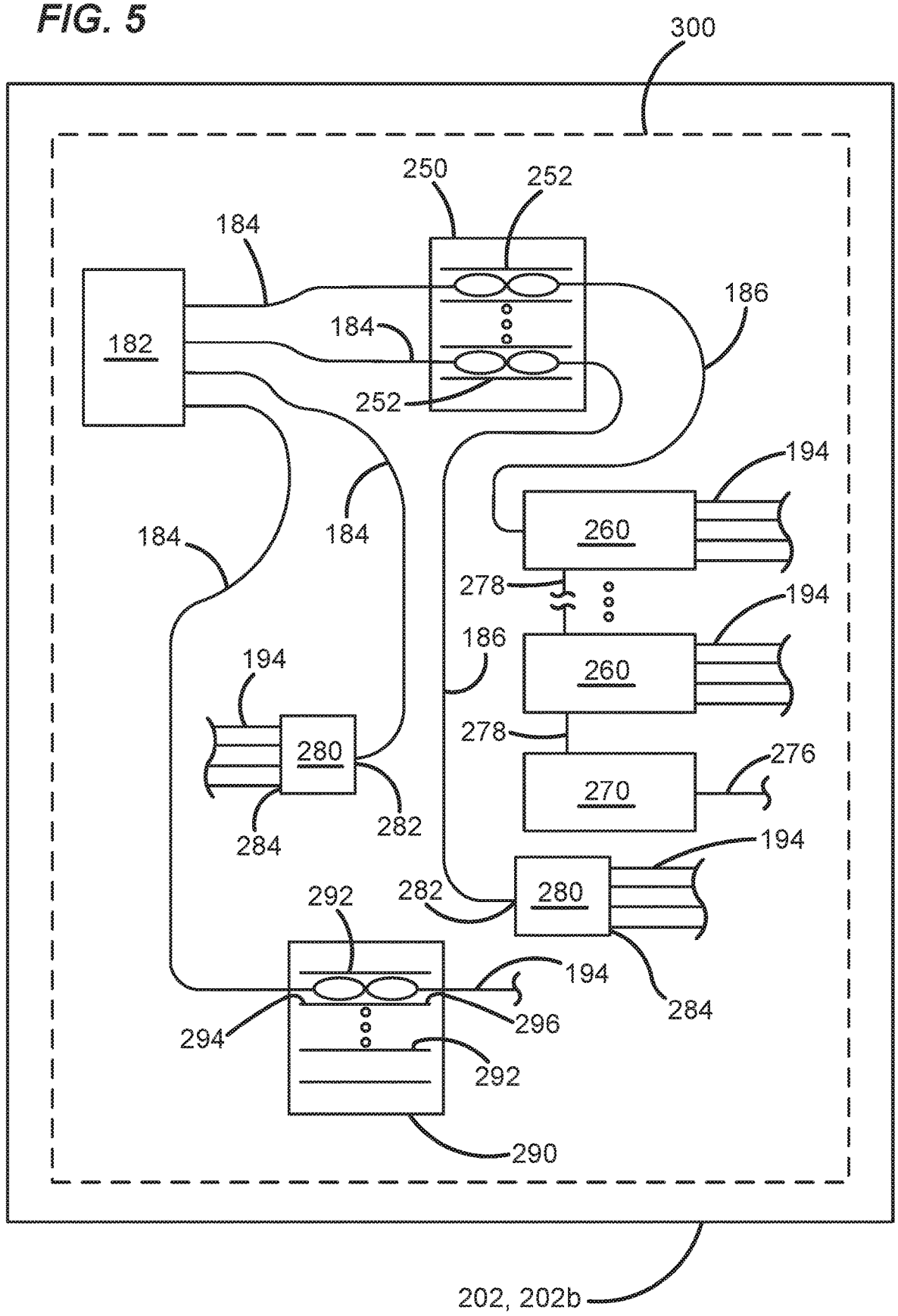
FIG. 5 is a schematic diagram showing another example cable routing scheme suitable for the active fiber distribution hub of FIG. 2.

Referring generally to FIGS. 4 and 5, the cabinet 202 can be configured to include one or more optical coupling paths for the feeder and distribution cable fibers. In accordance with some aspects of the disclosure, optical signals carried by the fibers of the feeder cable(s) 180 are split onto the fibers of the distribution cable(s) 190 at one or more components within the cabinet 202. In some implementations, the components splitting the optical signals include one or more active splitting modules 260. In certain examples, the active splitting module 260 includes a signal amplifier as will be discussed in more detail herein. In other implementations, the components splitting the optical signals include one or more passive optical splitters 280. In certain implementations, the cabinet 202 also may include a pass-through termination field 290 to allow unsplit optical signals to be passed between the feeder cable 180 and the distribution cable 190. By refraining from splitting a feeder cable fiber, a stronger signal can be sent to one of the subscribers over a distribution cable fiber.

In certain implementations, the feeder cable 180 is connected to the inputs 262, 282 of the active splitting modules 260 and/or the passive optical splitters 280 via a cross-connect region 250. The cross-connect region 250 includes a plurality of optical adapters 252 having front ports 254 and rear ports 256. The front ports 254 are accessible from the front side 302 of the frame 300 and the rear ports 256 are accessible from the rear side 304 of the frame. Accordingly, the front ports 254 are accessible and the rear ports 256 are not accessible through the access opening 215 of the cabinet 202 when the frame 300 is closed.

Connectorized fibers 184 of the feeder cable 180 can be routed to the rear ports 256 of the adapters 252 of the cross-connect region 250. Intermediate fibers (e.g., patchcords) 186 can be routed between the front ports 254 of the cross-connect region 250 and the input 262 of each active splitter module 260. In some implementations, intermediate fibers 186 also can be routed between the front ports 254 of the cross-connect region 250 and the input 282 of each passive optical splitter 280. In other implementations, the connectorized fibers 184 may be routed directly to the inputs 282 of the passive optical splitters 280.

In some implementations, a cabinet 202 may be configured to include the cross-connect region 250 and one or more active splitting devices 260 without any passive splitting devices 280 or pass-through termination field 290 (e.g., see FIG. 4). In implementations, a cabinet 202 may be configured to include the cross-connect region 250, one or more active splitting devices 260, and one or more passive splitting devices 280 without a pass-through termination field 290. In other implementations, a cabinet 202 may be configured to include the cross-connect region 250, one or more active splitting devices 260, one or more passive splitting devices 280, and a pass-through termination field 290 (e.g., see FIG. 5). In other implementations, a cabinet 202 may be configured to include the cross-connect region 250, one or more active splitting devices 260, and a pass-through termination field 290 without any passive splitting devices 280.

In FIG. 4, the cabinet 202a includes one or more splitting modules 260 each having an input de-mateable connection interface location (e.g., a port) 262 and an output de-mateable connection interface location (e.g., a ports) 264. In some examples, the output de-mateable connection interface location 264 is a multi-fiber connection interface location. In other examples, the splitting module 260 includes multiple output de-mateable connection interface locations 264. Each splitting module 260 splits optical signals received at the input de-mateable connection interface location 262 onto the output de-mateable connection interface location(s) 264.

In an example, the splitting module 260 includes thirty-two output de-mateable connection interface locations 264 and one input de-mateable connection interface location 262. In other examples, the splitting module 260 may include a greater or lesser number (e.g., eight, twelve, sixteen, twenty-four, forty-eight, sixty-four, ninety-six, etc.) of output de-mateable connection interface locations 264. In certain examples, the splitting module 260 defines thirty-two output channels (e.g., separated wavelengths) carried to the one or more output de-mateable connection interface location(s) 264. In other examples, the splitting module 260 may include a greater or lesser number (e.g., eight, twelve, sixteen, twenty-four, forty-eight, sixty-four, ninety-six, etc.) of output channels. In certain examples, the splitting module 260 may include multiple input de-mateable connection interface locations 262.

In certain implementations, the splitting module 260 also includes an amplifier or other active component to boost or strengthen the optical signals. For example, the amplifier may boost the strength of downstream optical signals (i.e., optical signals provided from subscribers 105 to the central office 101). Accordingly, the cabinet 202a also may include a power supply 270 that receives power from the power cable 272 (e.g., via the wire pigtail 276). In an example, the power supply 270 connects to the wire pigtail 276 at the rear side 304 of the frame 300. A power connection line 278 extends from the power supply 270 to the splitting module 260. In certain examples, multiple splitting modules 260 can be daisy-chained to the power supply 270 using multiple power connection lines 278. In certain examples, the power connection lines 278 are accessible at the rear side 304 of the frame 300.

In certain implementations, the cross-connect region 250 includes one or more optical adapters 252, each having a first port 254 that receives one of the connectorized input cable fibers 184 and a second port 256 that receives a first connectorized end of an intermediate fiber 186. The second end of the intermediate fiber 186 can be plugged into the input 262 of one of the splitting modules 260. In certain examples, the cross-connect region 250 includes a panel or bulkhead carrying the optical adapters 252. In some examples, the optical adapters 252 include single-fiber adapters (e.g., SC adapters, LC adapters, etc.). In other examples, the optical adapters 252 are multi-fiber adapters.

In FIG. 5, the cabinet 202b includes one or more active splitting modules 260, a cross-connect region 250, one or more passive optical splitters 280, and a pass-through termination field 290. The one or more active splitting modules 260 are powered by a power supply 270 same as in FIG. 4. At least some of the connectorized input fibers 184 are routed to the rear ports 256 of the adapters 252 at the cross-connect region 250. In some examples, one or more connectorized input fibers 284 may be routed to the inputs 282 of the passive optical splitters 280 and/or to the rear ports 294 of optical adapters 292 at the pass-through termination field 290.

Intermediate fibers 186 may be routed between the front ports 254 of the adapters 252 of the cross-connect region 250 and the inputs 262, 282 of the active and passive splitting module 260, 280. In certain examples, an intermediate fiber 186 also may be routed between the front port 254 at the cross-connect region 250 and a front port 296 at the pass-through region 290.

In accordance with some aspects of the disclosure, the splitting devices 260 are disposed on a frame 300 disposed within the cabinet 202 (e.g., see FIGS. 4 and 5). The frame 300 is configured to move relative to the cabinet 202 between a closed position and an open position. When closed, the frame 300 is fully disposed within the cabinet 202. When the frame 300 is disposed in the open position, at least a portion of the frame 300 extends through the access opening 215 to an exterior of the cabinet 202.

In certain implementations, the cross-connection region 250 also is carried by the movable frame 300 to move in unison with the active splitting modules 260 (e.g., see FIGS. 4 and 5). In certain implementations, the one or more passive optical splitters 280 also are carried by the movable frame to move in unison with the active splitting modules 260 (e.g., see FIG. 5). In certain implementations, the pass-through termination field 290 also is carried by the movable frame 300 to move in unison with the active splitting modules 260 (e.g., see FIG. 5).

Figure 6:
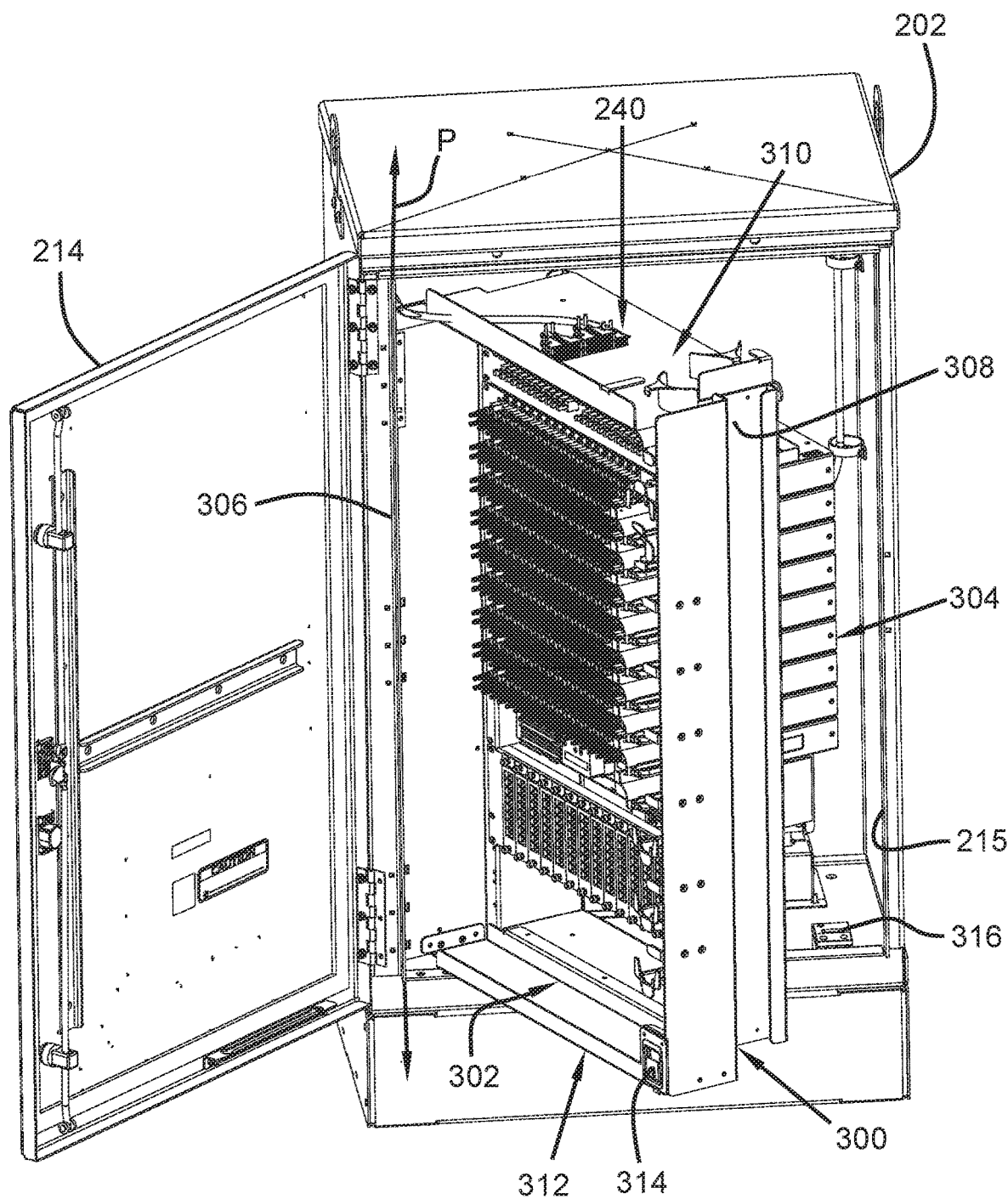
FIG. 6 is a perspective view of the active fiber distribution hub of FIG. 2 with the front door open and the frame pivoted to an open position.
Figure 7:
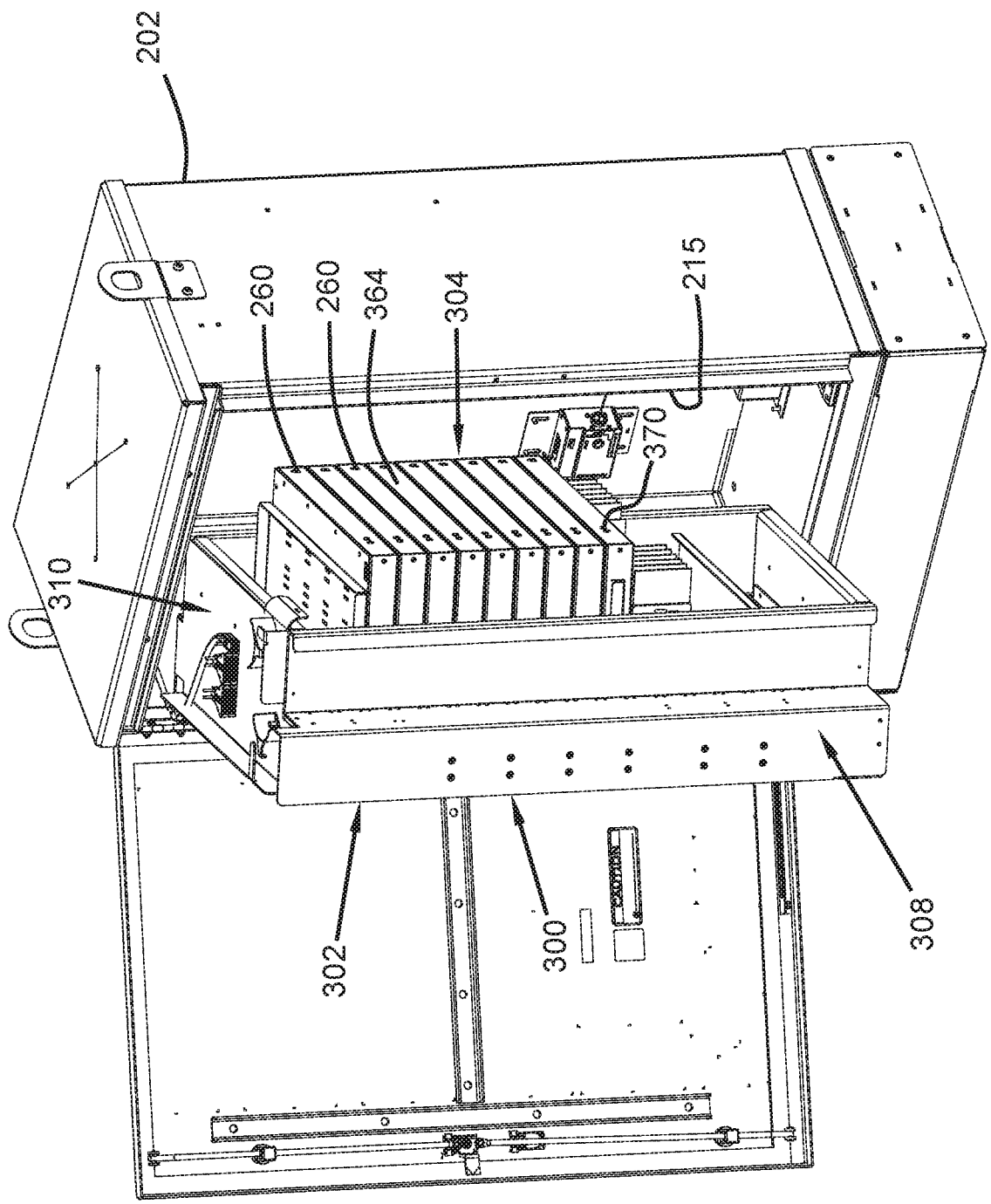
FIG. 7 is another perspective view of the active fiber distribution hub of FIG. 6 showing the rear side of the frame.

Referring to FIGS. 6 and 7, the frame 300 has a front side 302 and an opposite rear side 304. When the frame 300 is in the closed position, the front side 302 faces the access opening 215 of the cabinet 202. The rear side 304 of the frame 300 faces away from the access opening 215. When the frame 300 is disposed in the open position, at least a portion of the rear side 304 of the frame 300 extends through the access opening 215 and is accessible from an exterior of the cabinet 202. In an example, the entire rear side 304 of the frame 300 is accessible when the frame 300 is open.

The frame 300 extends along a depth between the front and rear sides 302, 304, along a width between opposite first and second sides 306, 308, and along a height between a top 310 and a bottom 312. In certain implementations, the depth of the frame 300 extends along a majority of a depth of the cabinet 202. In certain implementations, the width of the frame 300 extends along a majority of a width of the cabinet 202. In certain implementations, the height of the frame 300 extends along a majority of a height of the cabinet 202.

In certain implementations, the frame 300 pivots between the open and closed positions. For example, the frame 300 may be coupled to the cabinet 202 about a hinge axis P (see FIG. 6) disposed at the first end 306 of the frame 300. When pivoted to the open position, the second end 308 of the frame 300 is located external of the cabinet 202. In certain examples, the hinge axis P is located at a common side of the cabinet 202 as a hinge axis for the door 214.

In certain implementations, the frame 300 is lockable relative to the cabinet 202. For example, the frame 300 may include a lock 314 that engages a slot 316 defined in the cabinet 202 to hold the frame 300 in position relative to the cabinet 202. In certain examples, the lock 314 releasably engages the slot 316 when the frame 300 is disposed in the closed position. In an example, the lock 314 automatically engages the slot 316 when the frame 300 is closed. In certain examples, the frame 300 can be locked relative to the cabinet 202 in the open position.

Figure 8:
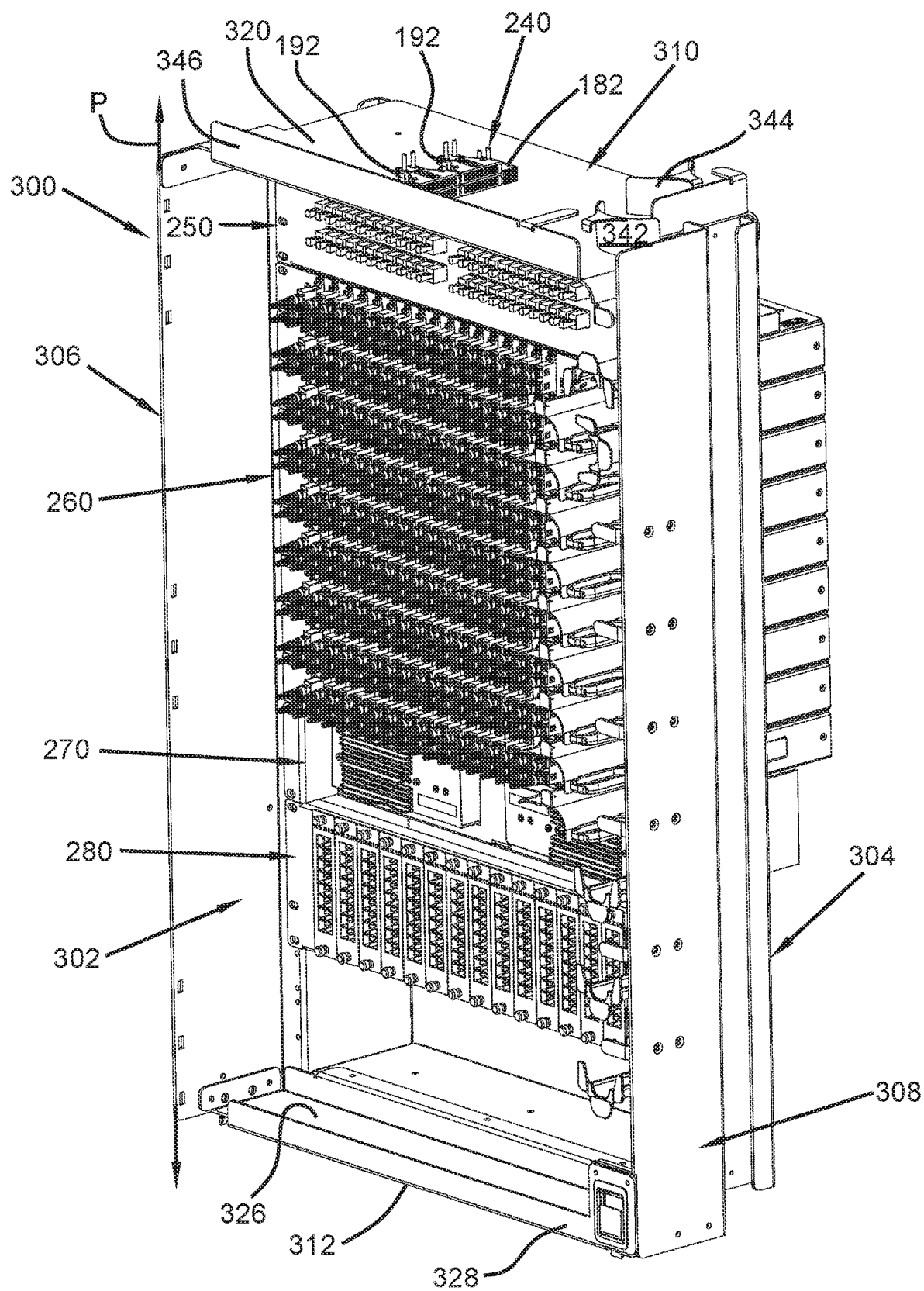
FIG. 8 is a front perspective view of an example frame suitable for use with the active fiber distribution hub of FIG. 2, the frame being populated with a cross-connection region, multiple active splitting modules, a power supply, and multiple passive optical splitters in accordance with the principles of the present disclosure.
Figure 9:
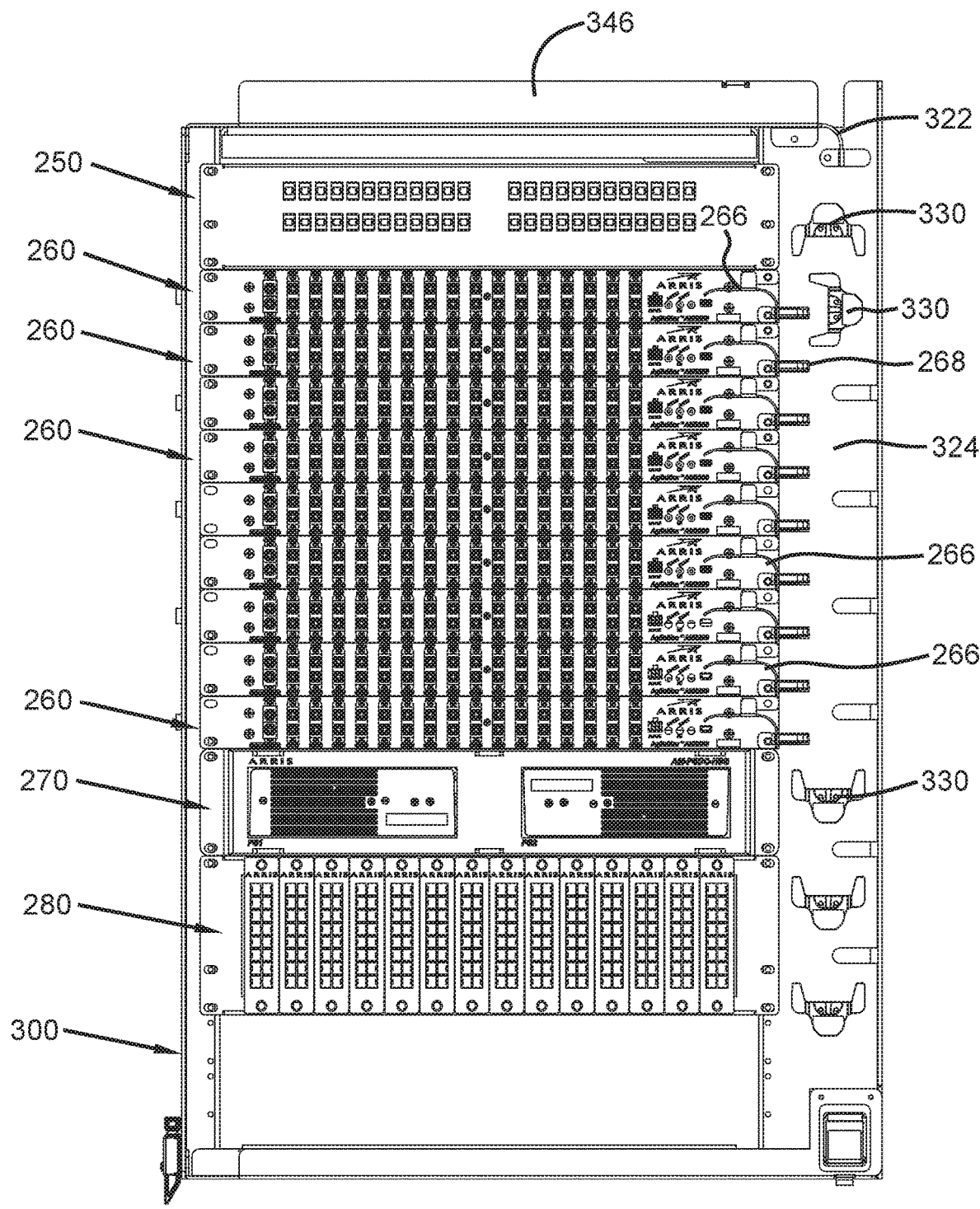
FIG. 9 is a front elevational view of the frame of FIG. 8.
Figure 10:
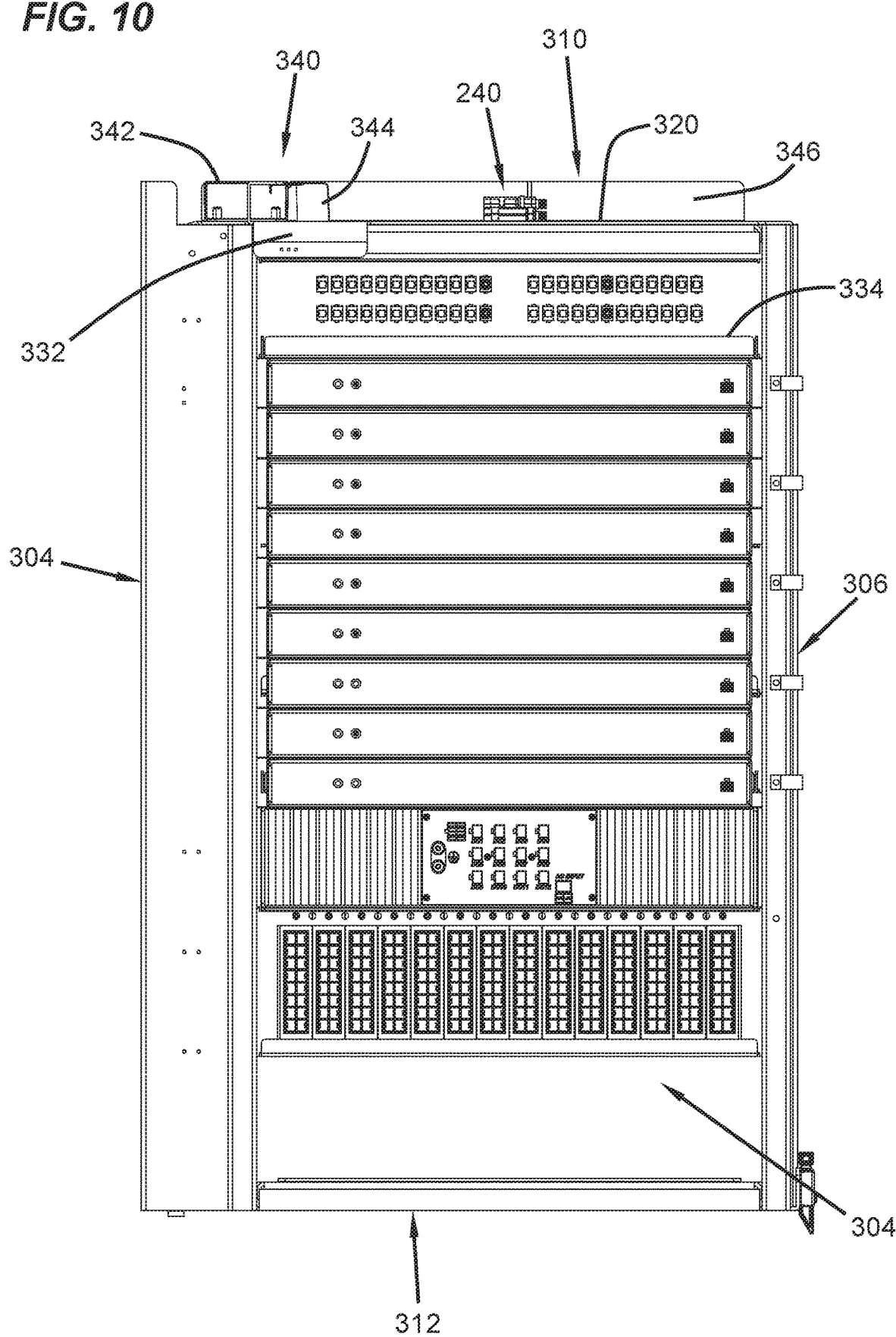
FIG. 10 is a rear elevational view of the frame of FIG. 8.
Figure 11:
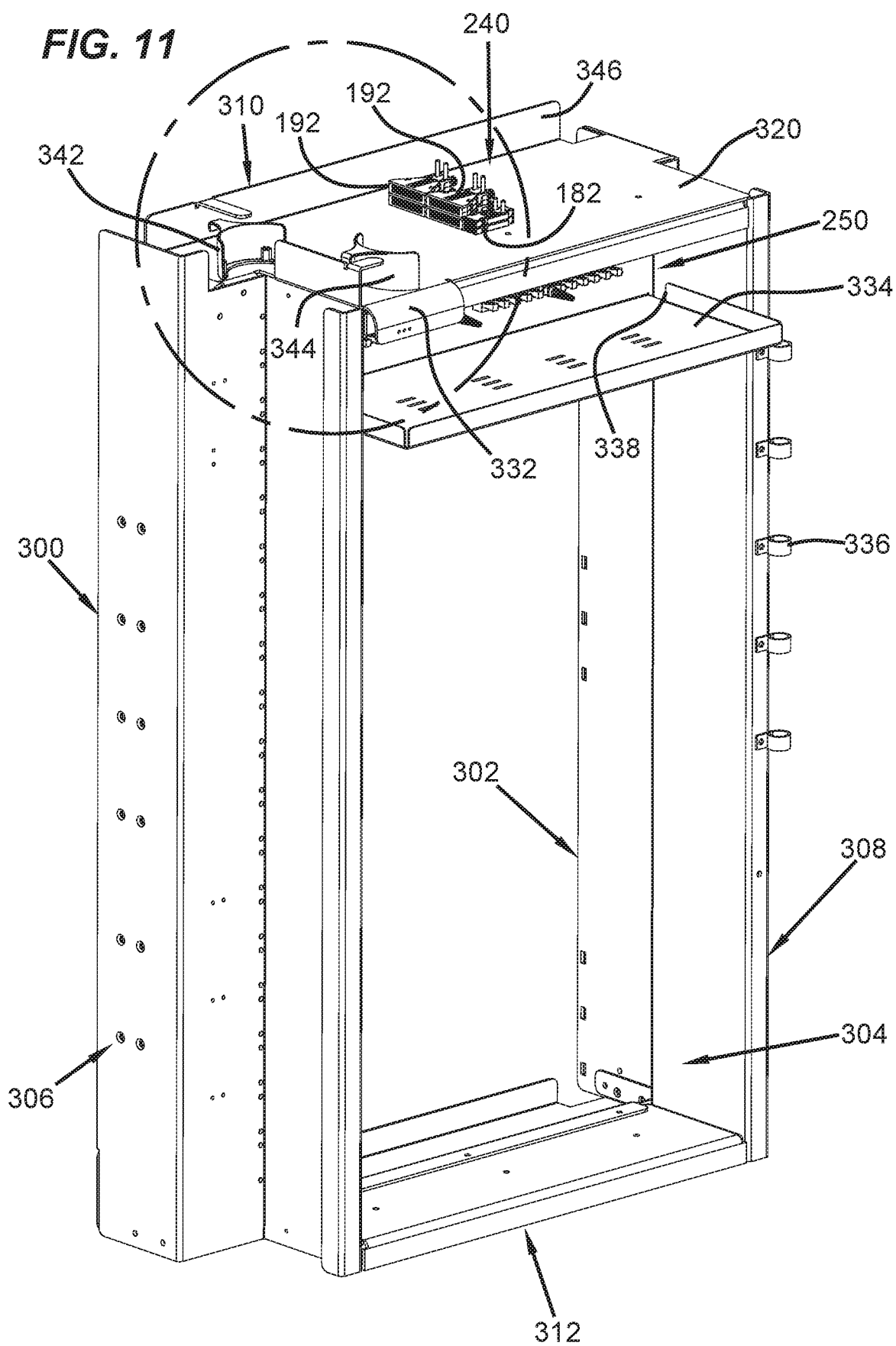
FIG. 11 is a rear perspective view of the frame of FIG. 8 with the passive optical splitters and pass-through termination field removed.

Referring to FIGS. 8-10, the components are arranged on the frame 300 in a column or stacked configuration with a routing channel 324 extending along one side of the components. In certain examples, the cross-connect region 250 is disposed towards a top of the frame 300, the active splitting modules 260 are disposed beneath the cross-connection region 250, and the power supply 270 is disposed between the active splitting modules 260. In the example shown, passive optical splitters 280 are disposed beneath the power supply 270. In the example shown, the frame 300 has room to receive a pass-through termination field (e.g., an adapter panel) beneath the passive optical splitters 280. A routing channel 324 extends vertically along an opposite side of these components from the hinge axis P. In certain examples, the routing channel 324 leads to a tray or trough 326 disposed at the bottom 312 of the frame 300. The tray or trough 326 may be bounded by a lip 328.

The active splitting modules 260 are disposed on the frame 300 so that at least the output de-mateable connection interface locations 264 are accessible from the front side 302 of the frame 300. The cross-connect region 250 is disposed on the frame 300 so that the front ports 254 are accessible from the front side 302 of the frame 300 and the rear ports 256 are accessible from the rear side 304 of the frame 300. The passive optical splitters 280 are disposed on the frame 300 so that at least the outputs 284 are accessible from the front side 302 of the frame 300. The pass-through termination field 290 is disposed on the frame 300 so that the front ports 296 are accessible from the front side 302 of the frame 300 and the rear ports 294 are accessible from the rear side 304 of the frame 300. The routing channel 324 is disposed at the front side 302 of the frame 300.

In certain implementations, the fibers of the feeder cable 180 and the distribution cable 190 can be fanned out on the frame 300. For example, a fan out region 240 may be carried by the frame 300 in unison with the active splitting modules 260. In certain examples, each distribution cable 190 is routed to a separate fan out 192 at which the individual fibers are separated. In certain examples, the feeder cable 180 is routed to a different fan out 182 from the distribution cable 190.

In certain examples, the fan out region 240 is disposed at a routing surface 320 at the top 310 of the frame 300. A first guide (e.g., bend radius limiter) 322 leads from the routing surface 320 to the front side 302 of the frame 300. For example, the first guide 322 may lead to the routing channel 324. A second guide (e.g., bend radius limiter) 332 leads from the routing surface 320 to the rear side 304 of the frame 300. For example, the second guide 332 may lead towards a tray 334 at a bottom of the cross-connect region 250.

In certain implementations, the frame 300 includes a routing path along the rear side 304 of the frame 300. For example, a column of fiber guides or retention rings 336 may be disposed at the rear side 304. In certain examples, the column is disposed at a common side 308 of the frame 300 with the hinge axis P. The routing path leads from the tray 334 towards a bottom 312 of the frame 300. For example, the routing path may lead to passive optical splitters 280 and/or to the pass-through termination field 290.

In certain implementations, various fiber routing guides 340 can be disposed on the frame 300. In certain implementations, a radius limiter 342 is disposed at the routing surface 320 to guide fibers towards the first guide 322. In certain implementations, a radius limiter 344 is disposed at the routing surface 320 to guide fibers towards the second guide 332. A lip 346 may extend upwardly from the routing surface 320 at the front 302 of the frame 300 to help retain fibers on the routing surface 320. Retention fingers also may extend over the routing surface 320 (e.g., from the lip 346) to help retain fibers at the routing surface 320.

One or more spools or radius limiters 324 are disposed within the routing channel 324 to manage slack length of the fibers routed along the frame 300. For example, slack length of the intermediate fibers 186 and/or the connectorized distribution fibers 194 can be managed within the routing channel 324. In an example, the slack length is routed down along the channel 324 to form a half loop and then routed back up to the desired component.

In certain implementations, the active splitting modules 260 include fiber guides 266 that lead optical fibers from the output de-mateable connection interface locations 264 to the routing channel 324 of the frame 300 (e.g., see FIG. 9). For example, each active splitting module 260 may include a forwardly extending guide 266 that extends generally horizontally. In certain examples, the forwardly extending guide 266 is curved downwardly at the side facing the routing channel 324. In certain examples, the forwardly extending guide 266 is curved downwardly at the side facing the output de-mateable connection interface locations 264. In certain examples, the forwardly extending guide 266 may include a fiber retention ring 268 at an outer side thereof to aid in routing fibers through the routing channel 324.

Figure 12:
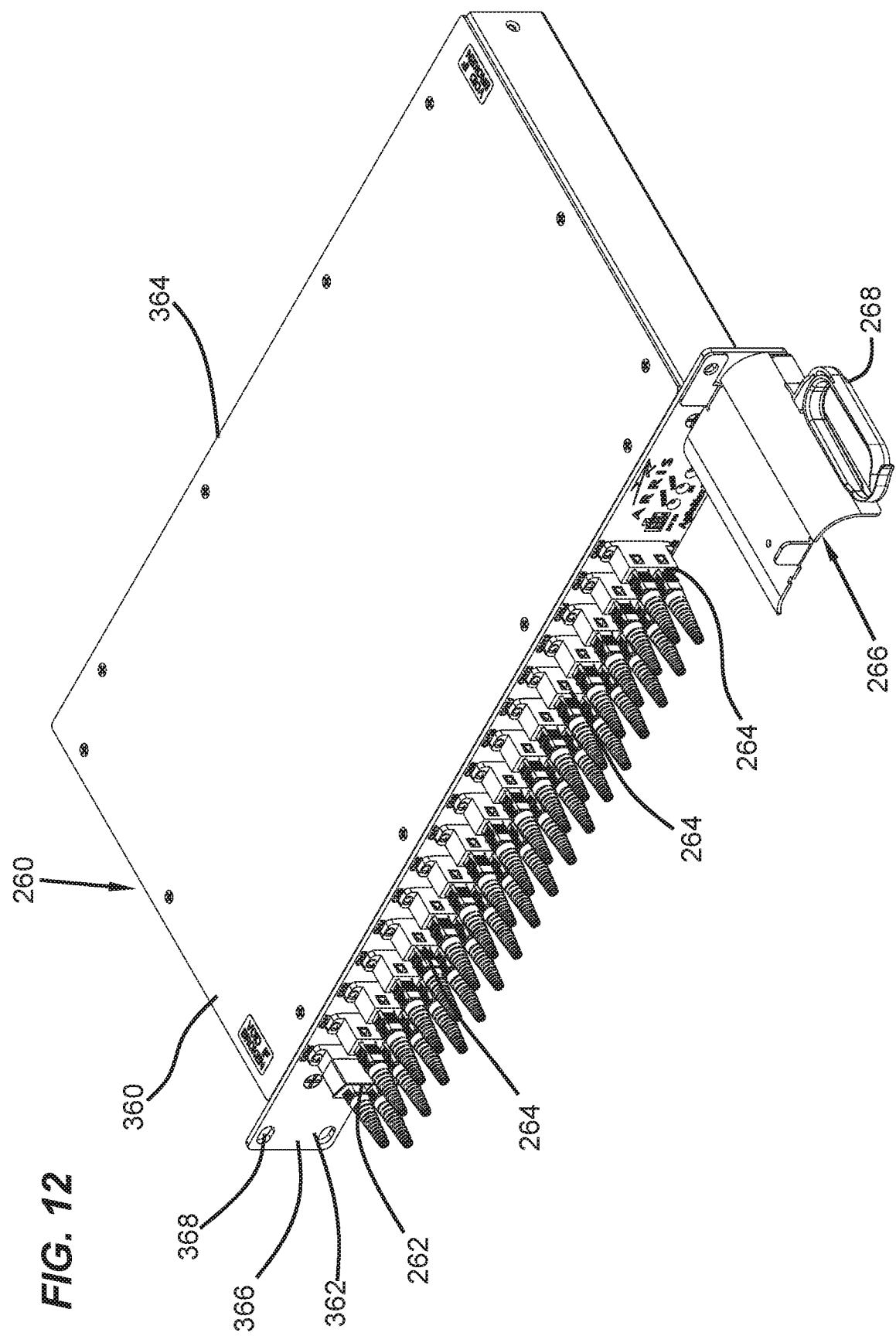
FIG. 12 is a front perspective view of an example active splitting module.
Figure 13:
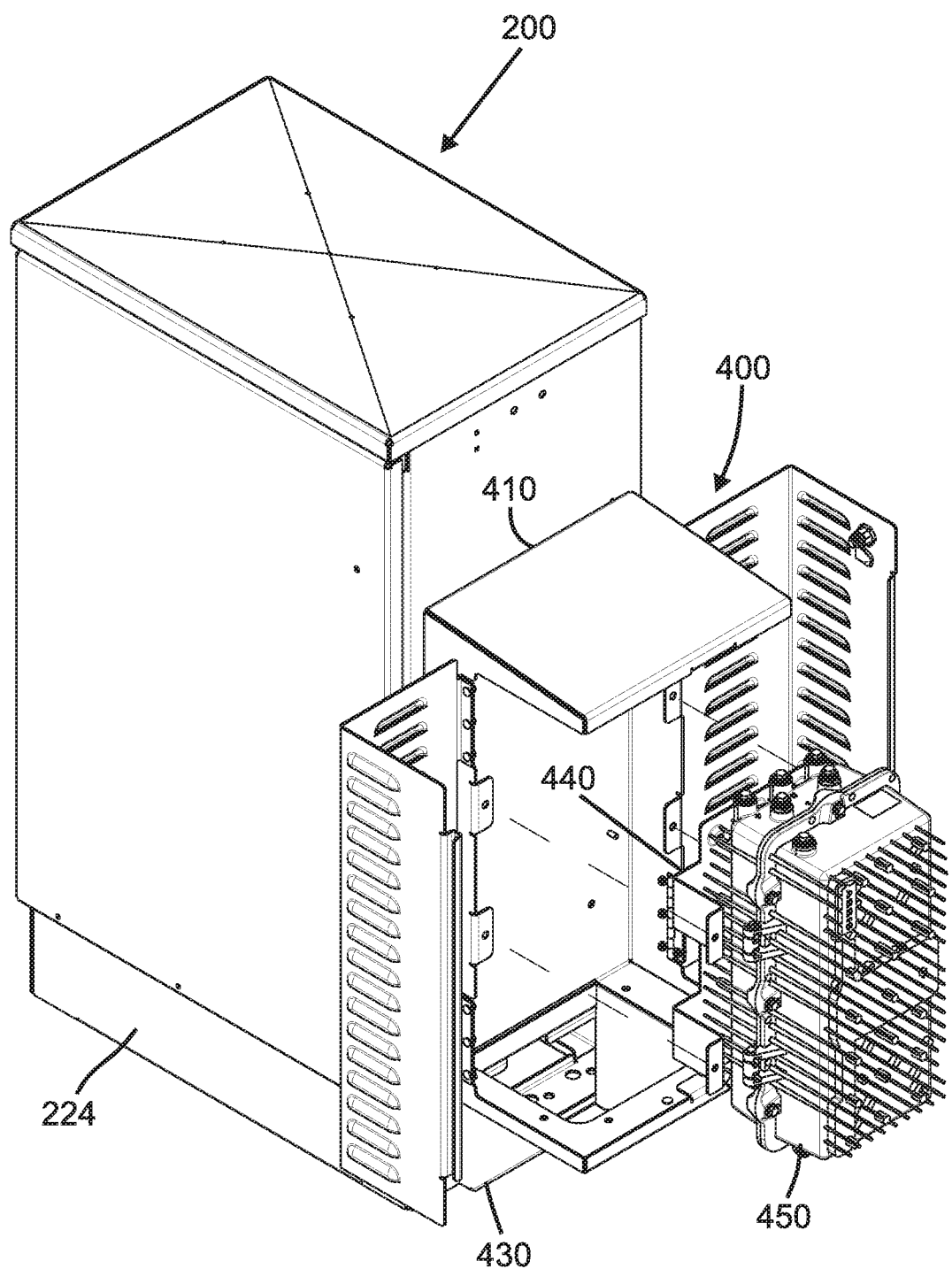
FIG. 13 is a perspective view of the fiber distribution hub of FIG. 2 with a shroud arrangement mounted thereto and a virtual hub exploded outwardly from the shroud arrangement.

FIG. 12 shows one example active splitting module 260. The active splitting module 260 includes a chassis 360 extending along a depth between a front end 362 and a rear end 364. In certain implementations, the chassis 360 includes a faceplate 366 that defines the front end 362. In certain examples, the faceplate 366 is configured to mount the chassis 360 to the frame 300. For example, the faceplate 366 may define mounting openings 368 at which the chassis 360 can be fastened to the frame 300.

A plurality of de-mateable connection interface locations 262, 264 are disposed at the front end 362 (e.g., on the faceplate 366). For examples, a plurality of optical adapters may be disposed at the front end 362. The optical adapters have outer ports 262, 264 accessible from an exterior of the chassis 360 and internal ports accessible from an interior of the chassis 360. In the example shown, the output ports defining the output de-mateable connection interface locations 264 are disposed in one or more rows.

In certain examples, the ports 370 for the wire pigtail 276 and/or the power connection line 278 are disposed at the rear end 364 of the chassis 360 (see FIG. 7). Accordingly, the power connections are accessible from the rear side 304 of the frame 300. Thus, the power connections are not accessible through the access opening 215 of the cabinet 202 when the frame 300 is in the closed position within the cabinet 202. The frame 300 also blocks access to the power entry module 274 when the frame 300 is closed.

The active splitting module 260 also includes one or more splitting devices (e.g., a wave division multiplexer) for separating out optical signals by wavelength disposed within the chassis 360. The splitting module 260 also includes an optical repeater (e.g., an erbium-doped fiber amplifier) that boosts the intensity of optical signals carried through the chassis 360. For example, the repeater may boost the signal strength of optical signals received from the subscribers 105 and traveling downstream towards the central office 101.

In some implementations, the one or more splitting devices of the active splitting module 260 includes a coarse wave division multiplexer (CWDM). In certain implementations, the active splitting module 260 includes multiple CWDM upstream wavelength channels to link to subscriber equipment. For example, the active splitting module 260 may have an operating wavelength of CWDM band 1271-1611 nm. In an example, the active splitting module 260 uses 1551 nm (e.g., with a tolerance of plus or minus 7.5 nm) as a return band while using the remainder of the band as upstream channels.

In certain implementations, the active splitting module 260 includes a dedicated CWDM return transmitter to provide a return link back to a headend or hub. The dedicated CWDM return transmitter may utilize multiple CWDM return wavelengths. Accordingly, in certain examples, multiple splitting modules 260 may share a return fiber.

Referring to FIGS. 13-17, the FDH 200 can be used in connection with a virtual hub (VHub) 450 at a common network location. In some implementations, the virtual hub forms part of an existing network to which the FDH 200 is being added. For example, the FDH 200 can be added to the network at the location of the VHub 450 to mitigate optical beat interference at the VHub 450. In other implementations, the VHub 450 and FDH 200 can be co-installed at the network location. In still other implementations, the FDH 200 can replace the VHub 450 at the network location.

The VHub 450 includes a re-enterable enclosure defining one or more cable ports 454 to which corresponding network cables can be routed. Various types of active equipment can be mounted within the VHub 450. In certain implementations, the active equipment is configured to replicate and extend headend functionality to remote locations in rural or new business and home developments. The VHubs 450 enable traditional broadcast/narrowcast (BC/NC) amplification, combining, and point-to-multipoint distributions; long reach Fiber-deep; Hybrid Fiber Coax (HFC) to Radio Frequency over Glass (RFoG) conversions for long-haul FTTx; and RFoG plus 10/10G EPON (Ethernet Passive Optical Network) transmission supporting high-speed PON and Broadband Internet service.

In some implementations, the VHub 450 can be mounted to the cabinet 202. In accordance with other aspects of the disclosure, however, the VHub 450 is installed within a shroud arrangement 400, which is mounted to the cabinet 202. For example, the shroud arrangement 400 can be installed at the cabinet 202 prior to installing the optical equipment (e.g., the splitting devices 260) to the movable frame 300. The VHub 450 is installable within the shroud arrangement 400 without accessing an interior of the cabinet 202. Accordingly, installation of the VHub 450 does not interfere with or present the risk of interfering with the optical equipment within the cabinet 202.

The shroud arrangement 400 includes a shroud body 410 that mounts to an exterior of the cabinet 202 and a bracket 440 the mounts the VHub 450 to the shroud body 410. The shroud body 410 and bracket 440 are configured so that the bracket 440 does not mount directly to the cabinet 202. In certain implementations, the shroud body 410 and bracket 440 are configured to space the VHub 450 away from the cabinet 202. In certain implementations, the shroud body 410 is configured to enclose the VHub 450. In certain examples, the shroud body 410 also encloses cables extending between the VHub 450 and the FDH 200.

In certain implementations, the shroud body 410 includes a rear wall 412 that mounts to the exterior of the cabinet 202 (e.g., to a sidewall 208, 210). The shroud body 410 defines an interior 415 extending forwardly of the rear wall 412 along a depth of the shroud body 410. The shroud body 410 also defines a front opening 417 through which the interior 415 is accessible. One or more doors 422 are mounted to the shroud body 410 to selectively open and close the front opening 417. The shroud body 410 includes a bracket mounting station 420 at which the bracket 440 is mounted to the shroud body 410. The bracket mounting station 420 is disposed within the interior 415 offset forwardly from the rear wall 412. In certain implementations, the bracket mounting station 420 is offset rearwardly from the front opening 417.

In certain implementations, the shroud body 410 includes a top panel 414 and a bottom panel 416 that extend forwardly from the rear wall 412 to the front opening 417. In some implementations, the bottom panel 416 defines a cable opening 418 through which the cables can enter the interior 415 of the shroud body 410. In other implementations, the cable opening may be defined through the rear wall 412. In some examples, sidewalls of the shroud body 410 also extend from the rear wall 412 to the front opening 417. In such examples, one or more doors 422 may be mounted to respective sidewalls at the front opening 417. In other examples, however, sidewalls extend from the rear wall 412 to intermediate locations along the depth of the shroud body 410. In certain examples, the bracket mounting stations 420 are disposed at the front ends of the sidewalls. In certain implementations, one or more doors 422 may be mounted to the sidewalls (e.g., see hinge 424) at the bracket mounting stations 420. In such implementations, the doors 422 may be wrap-around doors and form part of the sidewalls of the shroud body 410. In certain examples, the doors 422 include one or more locks 428.

Figure 14:
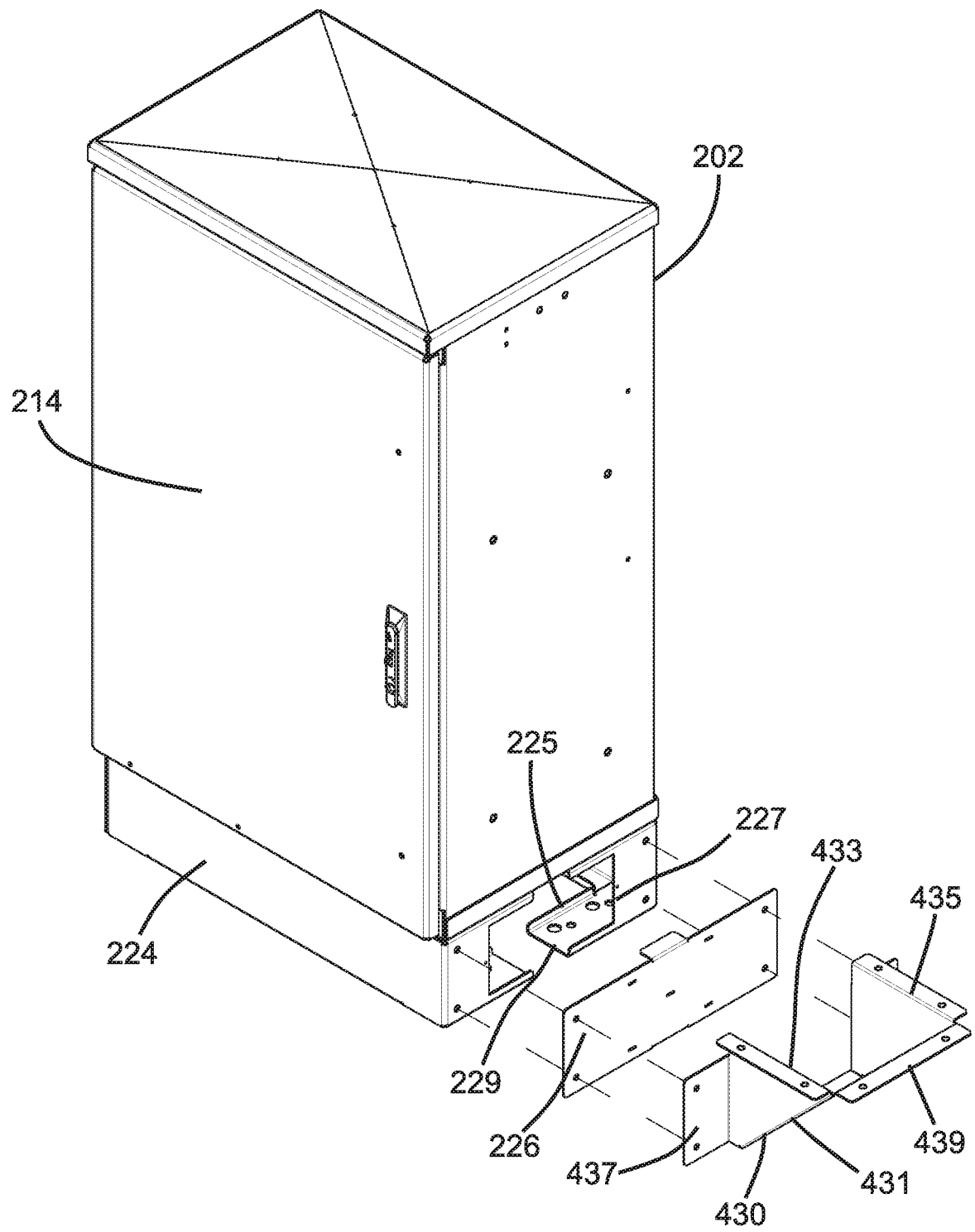
FIG. 14 shows the fiber distribution hub of FIG. 2 with a shroud adapter exploded off a side opening in a plinth on which a cabinet of the fiber distribution hub seats; a cover also is shown aligned with the side opening to use instead of the shroud adapter.
Figure 15:
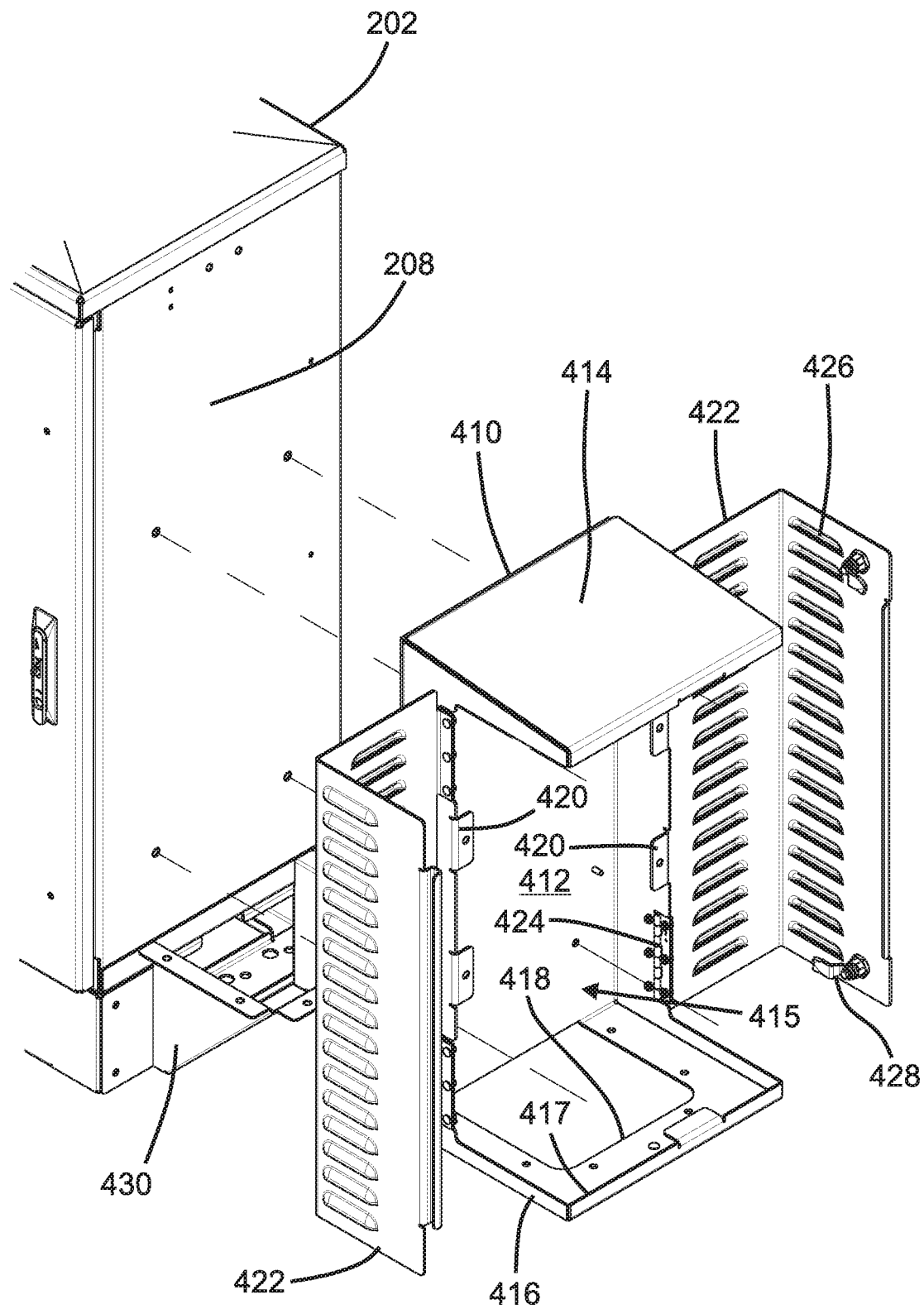
FIG. 15 shows a shroud body of the shroud arrangement of FIG. 13 exploded off the cabinet while the shroud adapter of FIG. 14 is shown mounted to the plinth, the shroud body defining a mounting station for the virtual hub of FIG. 13.

In certain implementations, cables routed to the FDH 200 and/or to the VHub 450 pass through a plinth 224 on which the cabinet 202 seats. As shown in FIG. 14, the plinth 224 defines a bottom opening 225 through which cables can enter the plinth 224 from a handhole enclosure, conduit, or other cable access point. The plinth 224 also defines a side opening 227 through which cables can be routed to the VHub 450 (e.g., through the opening 418 in the bottom panel 416 of the shroud body 410). A slot 229 may connect the bottom opening 225 with the side opening 227 for easy transitioning of the cables. When a VHub 450 is not intended to be installed at the FDH 200 (e.g., the FDH 200 replaces a VHub 450, the VHub 450 will be mounted elsewhere such as a nearly pedestal, etc.), a cover 226 extends over the side opening 227 to close the plinth 224.

In certain implementations, the shroud arrangement 400 includes a shroud adapter 430 that facilitates routing one or more optical fibers/cables between the plinth 224 and the shroud body 410. The shroud adapter 400 includes a body 431 that extends from a first open end 433 to a second open end 435. The first open end 433 of the adapter body 431 aligns with the side opening 227 in the plinth 224. The second open end 435 aligns with the cable opening 418 in the shroud body 410. A mounting first part 437 (e.g., a flange defining fastener openings) is disposed at the first open end 433 to mount the shroud adapter 430 to the plinth 224. A second mounting part 439 is disposed at the second open end 435 to mount the shroud adapter 430 to the shroud body 410. The shroud adapter 430 bridges the gap between the side opening 227 and the cable opening 418 to enclose the cables, either alone or in cooperation with the plinth 224.

In certain implementations, the bracket 440 is configured to mount the VHub 450 to the shroud body 410 at the bracket mounting station(s) 420. In certain examples, the bracket 440 includes a base 442 configured to attach to the VHub 450. For example, the base 442 may define one or more attachment parts 448 that align with one or more corresponding attachment parts 452 of the VHub 450. In the examples depicted in FIGS. 16 and 17, the attachment parts 448 include openings through which the corresponding attachment parts 452 of the VHub 450 extend. In other examples, the attachment parts 448 may be extensions that protrude into corresponding openings in the VHub 450 or other attachment mechanisms.

The bracket 440 also includes one or more arms 444 that extend from the base 442 to respective mounting sections 446 at which the bracket 440 is attached to the shroud body 410. For example, the mounting sections 446 may be flanges extending from distal ends of the arms 444. The flanges 446 may align with flanges defining the bracket mounting stations 420 within the shroud body 410. Fasteners can be inserted through aligned openings of the flanges. In other examples, one of the mounting sections 446 and the mounting stations 420 may define extensions that mate with openings in the other. In still other examples, the bracket 440 could be latched, friction fit, or otherwise mounted within the shroud body 410.

Figure 16:
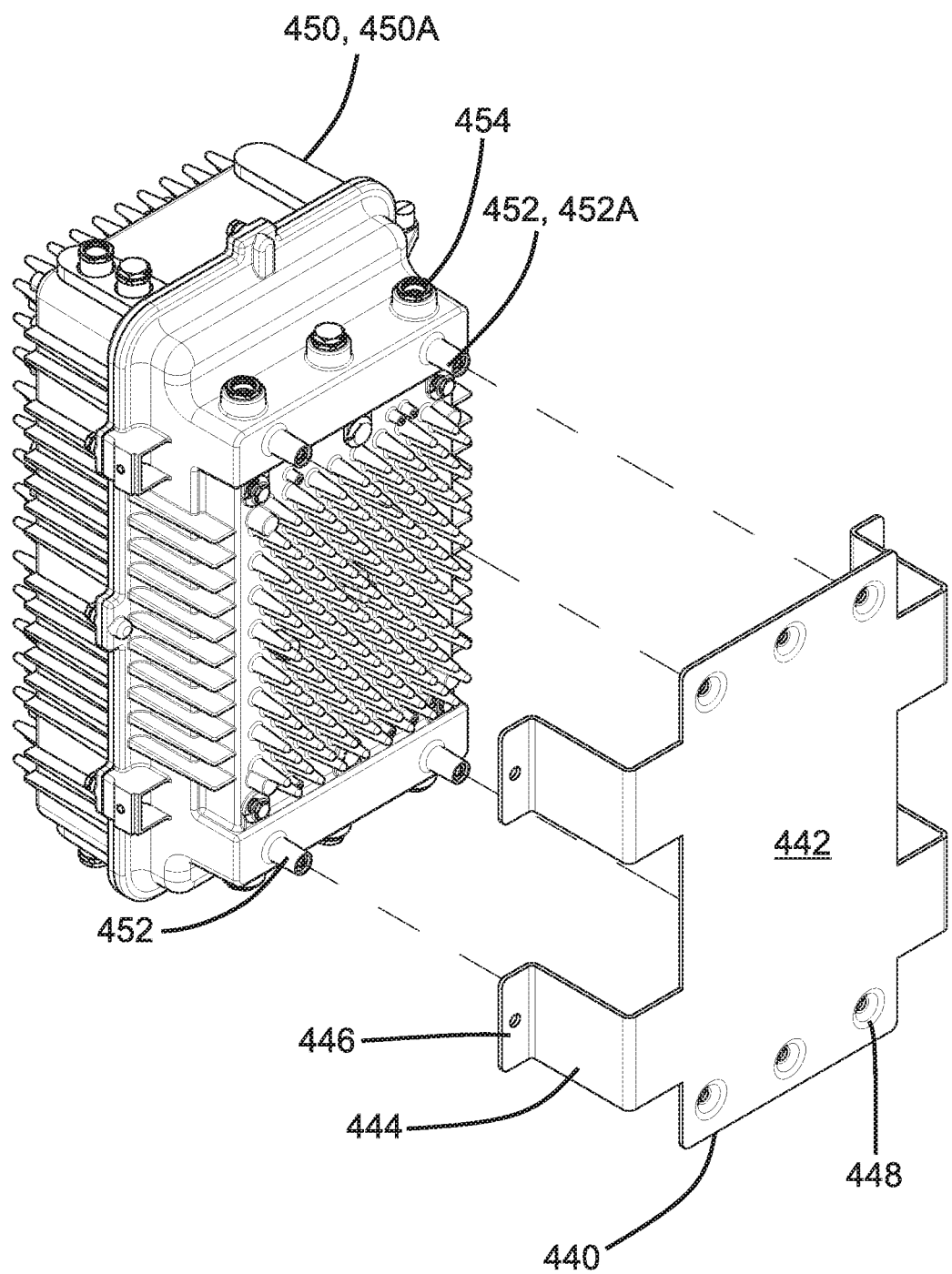
FIGS. 16 and 17 show how two different examples of virtual hubs can mount to a common bracket, which is configured to be secured within the shroud body at the mounting station.
Figure 17:
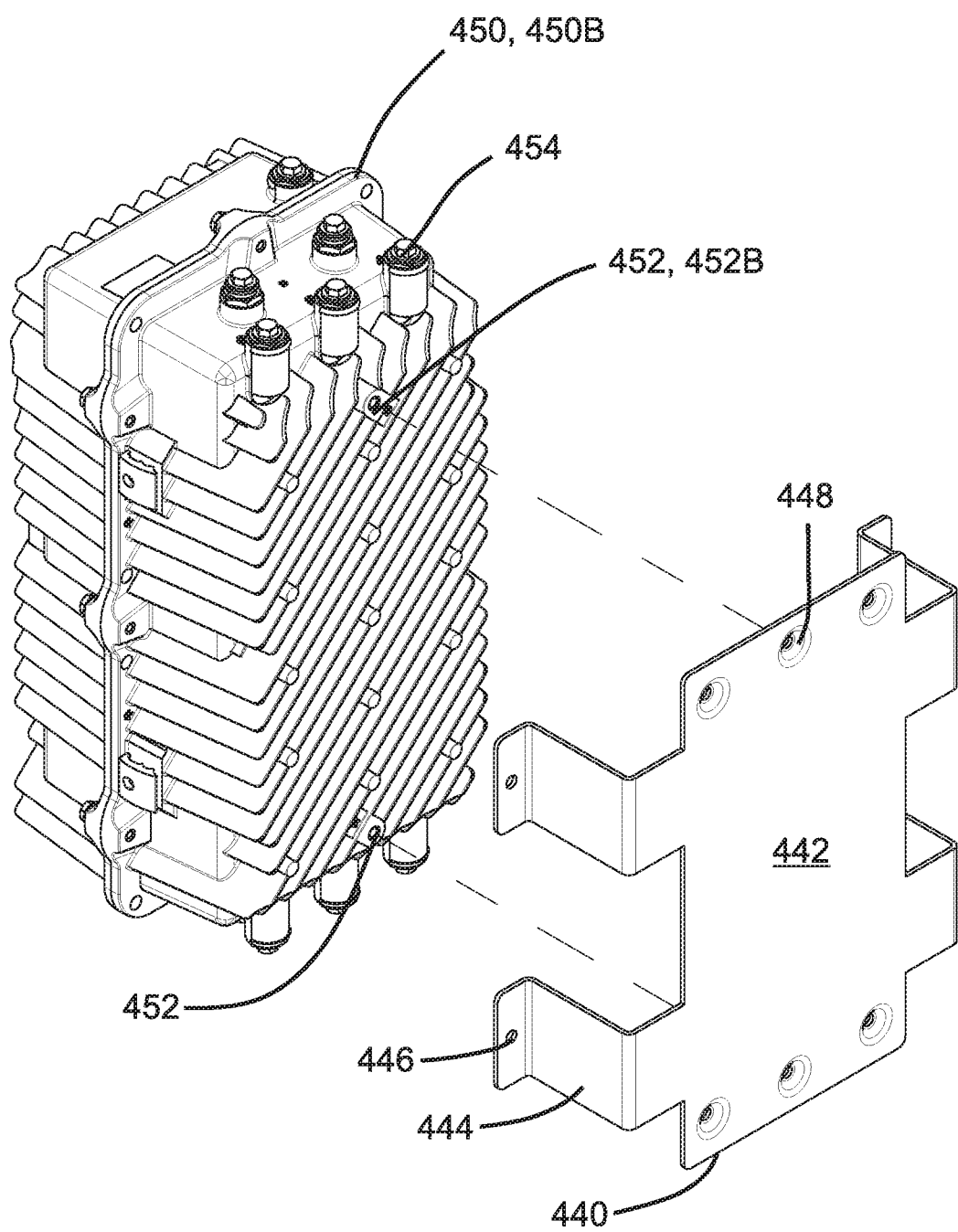

In certain implementations, the bracket 440 is configured to mount any of multiple types of VHubs 450 within the shroud body 410. For example, FIG. 16 shows the bracket 440 being installed on a first type 450A of VHub 450 while FIG. 17 shows the bracket 440 being installed on a second type 450B of VHub 45. The first type of VHub 450A includes attachment parts 452A that extend outwardly from an exterior of the VHub 450 to protrude through openings 448 defined in the corners of the base 442 of the bracket 440. The second type of VHub 450A includes openings 452B that align with openings 448 along a centerline of the bracket base 442. Other types of VHubs 450 and other types of attachment mechanisms are possible.

Having described the preferred aspects and implementations of the present disclosure, modifications and equivalents of the disclosed concepts may readily occur to one skilled in the art. However, it is intended that such modifications and equivalents be included within the scope of the claims which are appended hereto.

What is claimed is:

1. A fiber distribution hub comprising:
a cabinet defining an interior accessible through an open front;
a frame pivotally mounted to the cabinet to move relative to the cabinet between an open position and a closed position, the frame being fully disposed within the interior of the cabinet when in the closed position, the frame extending at least partially out of the cabinet when in the open position, the frame having a front side facing the open front of the cabinet when the frame is disposed in the closed position, the frame also having a rear side opposite the front side;
a power supply mounted to the frame to be carried with the frame between the open and closed positions; and
an active splitting module mounted to the frame to be carried with the frame as the frame moves between the open and closed positions, the active splitting module including a housing having a front face accessible from the front side of the frame, the active splitting module including a first de-mateable connection interface location and a plurality of second de-mateable connection interface locations disposed at the front face, the active splitting module being configured to split an optical signal received at the first de-mateable connection interface location and to provide the split optical signal at the second de-mateable connection interface locations, the active splitting module being coupled to the power supply.

2. The fiber distribution hub of claim 1, further comprising a cross-connect region carried by the frame, the cross-connect region including a plurality of fiber optic adapters, each fiber optic adapter having a front port accessible from the front side of the frame and a rear port accessible from the rear side of the frame.

3. The fiber distribution hub of claim 2, wherein the cross-connect region is disposed above the active splitting module on the frame.

4. The fiber distribution hub of claim 1, wherein the active splitting module splits the optical signals by wavelength.

5. The fiber distribution hub of claim 1, wherein the active splitting module includes an amplifier to boost a strength of at least some of the optical signals passing through the active splitting module.

6. The fiber distribution hub of claim 2, wherein the active splitting module is one of a plurality of active splitting modules mounted to the frame, the plurality of active splitting modules being daisy-chained to the power supply.

7. The fiber distribution hub of claim 6, wherein the plurality of active splitting modules are disposed in a column between the cross-connect region and the power supply.

8. The fiber distribution hub of claim 1, wherein a fan out region is disposed at a top of the frame, wherein the fan out region includes at least a first fan out for separating fibers of a feeder cable and a second fan out for separating fibers of a distribution cable.

9. The fiber distribution hub of claim 8, wherein the frame includes a first routing path and a second routing path, the first routing path extending from the first fan out to the rear side of the frame, the second routing path extending from the second fan out to the front side of the frame, wherein the frame also includes a vertical routing channel disposed at the front side of the frame along the first routing path, wherein the vertical routing channel extends past the active splitting module.

10. The fiber distribution hub of claim 9, wherein the frame defines a hinge axis at an opposite side of the frame from the vertical routing channel.

11. The fiber distribution hub of claim 1, further comprising a passive optical splitter mounted to the frame to be carried with the frame when the frame moves relative to the cabinet.

12. The fiber distribution hub of claim 1, further comprising a pass-through termination field mounted to the frame to be carried with the frame when the frame moves relative to the cabinet.

13. The fiber distribution hub of claim 1, further comprising a stub distribution cable extending between a first end external of the cabinet and a second end disposed within the cabinet, the second end of the cable including connectorized fiber ends routed to the second de-mateable connection interface locations.

14. The fiber distribution hub of claim 1, further comprising a shroud arrangement mounted to an exterior surface of the cabinet, the shroud arrangement including a bracket mounting station spaced from the exterior surface of the cabinet.

15. The fiber distribution hub of claim 14, further comprising a virtual hub mounted to the shroud arrangement at the bracket mounting station.

16. The fiber distribution hub of claim 15, wherein the shroud arrangement includes a bracket that attaches to the virtual hub and attaches to a shroud body at the bracket mounting station.

17. The fiber distribution hub of claim 14, wherein the shroud arrangement includes a shroud body defining an interior accessible through a door, the shroud body defining the bracket mounting station, the door covering the bracket mounting station when closed and allowing access to the bracket mounting station when open.

18. The fiber distribution hub of claim 17, further comprising a plinth on which the cabinet seats; and wherein the shroud arrangement also includes a shroud adapter that encloses cables routed between the plinth and the shroud body.

19. A fiber distribution hub comprising:
body defining a first cable access opening and a second cable access opening facing in a different direction than the first cable access opening;
a cabinet seated on the body in alignment with the first cable access opening, the cabinet defining an interior accessible through an open front, the cabinet including an exterior surface;
optical equipment disposed within the interior of the cabinet;
a shroud body mounted to the exterior surface of the cabinet, the shroud body defining an interior separate from the interior of the cabinet, the shroud body carrying at least one door to selectively close the interior of the shroud body, the shroud body defining a mounting station, and the shroud body also defining a cable opening;
a shroud adapter extending between the second cable access opening of the body and the cable opening of the shroud body to define a cable routing passage between the body and the shroud body.

20. The fiber distribution hub of claim 19, further comprising a virtual hub mounted at the mounting station within the shroud body.

* * * * *